(12) United States Patent
Lee et al.

(10) Patent No.: US 7,623,208 B2
(45) Date of Patent: Nov. 24, 2009

(54) OPTICAL EFFICIENCY ENHANCING FILM AND LIQUID CRYSTAL DISPLAY USING THE SAME

(75) Inventors: Man Hoan Lee, Seoul (KR); Ha Young Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 54 days.

(21) Appl. No.: 10/878,408

(22) Filed: Jun. 29, 2004

(65) Prior Publication Data
US 2005/0140883 A1   Jun. 30, 2005

(30) Foreign Application Priority Data
Dec. 30, 2003   (KR) .................... 10-2003-0100348

(51) Int. Cl.
*G02F 1/1335* (2006.01)
(52) U.S. Cl. ..................................... 349/119
(58) Field of Classification Search ............... 349/119, 349/96, 120, 117; 359/315–317
See application file for complete search history.

(56) References Cited

U.S. PATENT DOCUMENTS

| | | | | |
|---|---|---|---|---|
| 5,751,388 A * | 5/1998 | Larson | | 349/96 |
| 5,825,542 A * | 10/1998 | Cobb et al. | | 359/487 |
| 5,867,240 A * | 2/1999 | Crawford et al. | | 349/118 |
| 6,543,153 B1 * | 4/2003 | Weber et al. | | 34/96 |
| 6,624,936 B2 * | 9/2003 | Kotchick et al. | | 359/490 |
| 2005/0062917 A1 * | 3/2005 | Kashima | | 349/120 |
| 2005/0219447 A1 * | 10/2005 | Slaney et al. | | 349/117 |
| 2006/0033850 A1 * | 2/2006 | Skjonnemand | | 349/13 |
| 2006/0103917 A1 * | 5/2006 | Skjonnemand | | 359/321 |
| 2006/0176426 A1 * | 8/2006 | Jeon et al. | | 349/116 |

* cited by examiner

*Primary Examiner*—James A Dudek
(74) *Attorney, Agent, or Firm*—McKenna Long & Aldridge

(57) ABSTRACT

The present invention relates to an optical efficiency enhancing film and an LCD using the same. The LCD of the present invention is provided with an optical efficiency enhancing film that includes uniaxial films made of a refractive index anisotropic material and isotropic films, wherein the uniaxial films and the isotropic films are alternatively laminated. Then, optical efficiency as well as polarization may be enhanced to thereby improve the brightness of the LCD.

3 Claims, 4 Drawing Sheets

OPTICAL EFFICIENCY ENHANCING FILM AND LIQUID CRYSTAL DISPLAY USING THE SAME

This application claims the benefit of Korean Patent Application No. 2003-100348, filed on Dec. 30, 2003, which is hereby incorporated by reference for all purposes as if fully set forth herein.

BACKGROUND OF THE INVENTION

1. Field of the Invention

The present invention relates to a liquid crystal display (LCD), and more particularly, to an optical efficiency enhancing film and an LCD using the same.

2. Discussion of the Related Art

Today, as our society rapidly advances to information-oriented society, a flat panel display having advantages of slimness, lightweight, and low power consumption is required.

The LCD is one of the flat panel displays having advantages of a superior visibility, a low power consumption and a low heat radiation in comparison with the cathode ray tube (CRT) having the same screen size. Because of the above advantages, the LCD is widely applied to hand-held terminals, computer monitors and televisions along with the plasma display panel (PDP) and the field emission display (FED), and is expected to be a next generation display.

The LCD includes two substrates each having an electrode for generating an electric field and facing each other, and a liquid crystal layer interposed therebetween. Then, a predetermined voltage is supplied to the electric field electrodes to generate electric field between the electric field electrodes so that liquid crystal molecules may be controlled by the generated electric field. As a result, optical transmission rate of the liquid crystal material can be adjusted to thereby display images.

In general, the liquid crystal molecules are anisotropically aligned. The anisotropy of a liquid crystal cell or a film consisting of the liquid crystal molecules is affected by distribution degree of the liquid crystal molecules and distribution degree tilt angles of the liquid crystal molecules with respect to a substrate. Such properties of the liquid crystal are a main factor to change polarization of light depending on a viewing angle of the liquid crystal cell or the film.

FIG. 1 illustrates a general LCD according to the related art.

In FIG. 1, an LCD includes a lower substrate 120, an upper substrate 130, a liquid crystal layer 140, a first polarization plate 129, and a second polarization plate 139. The lower substrate 120 is provided with thin film transistors (TFTs) (not shown) arranged in matrix configuration and pixel regions defined by gate lines and data lines (not shown). The upper substrate 130 corresponds to the lower substrate 120 and is provided with a color filter layer (not shown) consisting of a plurality of color filter patterns to represent colors. The liquid crystal layer 140 is made by filling liquid crystal between the upper substrate 130 and lower substrate 120. The first polarization plate 129 is attached to a lower surface of the lower substrate 120, and passes and linearly polarizes natural light. The second polarization plate 139 is attached to an upper surface of the upper substrate 130 and has an optical transmission axis perpendicular to that of the first polarization plate 129.

The LCD further includes a backlight unit 110 for supplying the liquid crystal panel with the light generated from a light source 111. At this time, the backlight unit 110 is provided on an outer side of the lower substrate 120.

For example, although not illustrated in FIG. 1, the lower substrate of the twisted nematic (TN) mode LCD (the lower substrate 120) includes a transparent substrate upon which gate lines and data lines (not shown) are formed to cross over each other, a gate electrode extending from the gate line, a gate insulating layer formed on an entire surface including the gate electrode, a semiconductor layer formed on the gate insulating layer, a thin film transistor formed on the semiconductor layer and having source/drain electrodes, and a passivation layer formed on the transparent substrate upon which the thin film transistor is formed, and a pixel electrode connected to the drain electrode through a contact hole formed on the passivation layer.

The upper substrate 130 includes a transparent substrate, a black matrix (BM) formed on the transparent substrate to prevent light from being transmitted through the regions other than the pixel electrodes, red, green and blue color filter patterns formed on the BM to represent colors, and a common electrode on the color filter patterns.

The first and second polarization plates 129 and 139 are formed on outer surfaces of the lower and upper substrate 120 and 130 respectively such that the optical transmission axes thereof may be perpendicular to each other. Natural light polarized to single polarized light is transmitted through the polarization plates but other polarized light is absorbed or scattered.

Generally, light is an electromagnetic wave and the oscillation direction is perpendicular to its traveling direction. Polarized light is a light whose oscillation direction is polarized, that is, a light oscillating strongly in a specific direction among the direction perpendicular to its traveling direction.

Accordingly, the light emitted from the backlight unit 110 provided on the lower portion of the liquid crystal panel oscillates in all the directions perpendicular to its traveling direction with the same probability. The first and second polarization plates 129 and 139 pass only the light that oscillates in the direction identical to the polarization axis thereof, but absorb or scatter, using a proper medium, the light that oscillates in the direction different from the polarization axis thereof, so that only the light that oscillates in a specific direction is transmitted through the polarization plates 129 and 139.

To make the polarization axes over and below the liquid crystal layer 140 be perpendicular to each other, the polarization plates 129 and 139 are attached to the outer surfaces of the lower and upper substrates 120 and 130 respectively. Then, the strength of the transmitted light is adjusted according to the rotation degree of polarization axis of the liquid crystal layer 140 such that grays between black and white colors may be represented.

However, in the LCD of related art, the light transmitted through and polarized by the first polarization plate 129 generates non-polarized light in passing the inside of the liquid crystal panel. For example, the light is scattered by the step portion formed on the lower substrate 120 and the color filter layer 133 formed on the upper substrate 130. Thus, some of the light polarized by the first polarization plate 129 is changed into the non-polarized light due to such scatterings.

Accordingly, the optical transmission rate of the LCD of the related art is dramatically lowered due to the non-polarized light so that the brightness is lowered.

SUMMARY OF THE INVENTION

Accordingly, the present invention is directed to an optical efficiency enhancing film and an LCD using the same that substantially obviates one or more problems due to limitations and disadvantages of the related art.

An advantage of the present invention is to provide an optical efficiency enhancing film and an LCD using the same in which the film made of anisotropic material is formed on a lower substrate of the LCD such that the optical efficiency may be enhanced.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an optical efficiency enhancing film including uniaxial films made of a refractive index anisotropic material, and isotropic films, wherein the uniaxial films and the isotropic films are alternatively laminated.

The uniaxial film may be an A-plate. The isotropic film may be replaced with one selected from the group consisting of a C-plate of biaxial film and a negative C-plate aligned vertically.

In another aspect of the present invention, there is provided an LCD including a lower substrate provided with pixel regions defined by gate lines and data lines and TFTs arranged in matrix configuration, an upper substrate corresponding to the lower substrate and provided with a color filter layer consisting of a plurality of color filter patterns to represent colors, a liquid crystal layer interposed between the upper substrate and lower substrate, a first polarization plate disposed on the lower substrate, and passes and linearly polarizes natural light, a second polarization plate disposed on the upper substrate and having an optical transmission axis perpendicular to that of the first polarization plate, and an optical efficiency enhancing film formed on the lower substrate and having an optical transmission axis substantially identical to that of the first polarization plate.

The optical efficiency enhancing film may be made of a refractive index anisotropic material.

The optical efficiency enhancing film may have a property of a polarizer for converting natural light into linearly polarized light.

The optical efficiency enhancing film may be coated and formed on the lower substrate and the first polarization plate may be coated and formed on the optical efficiency enhancing film.

The optical efficiency enhancing film may be formed between the liquid crystal layer and the lower substrate or on an outer surface of the lower substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
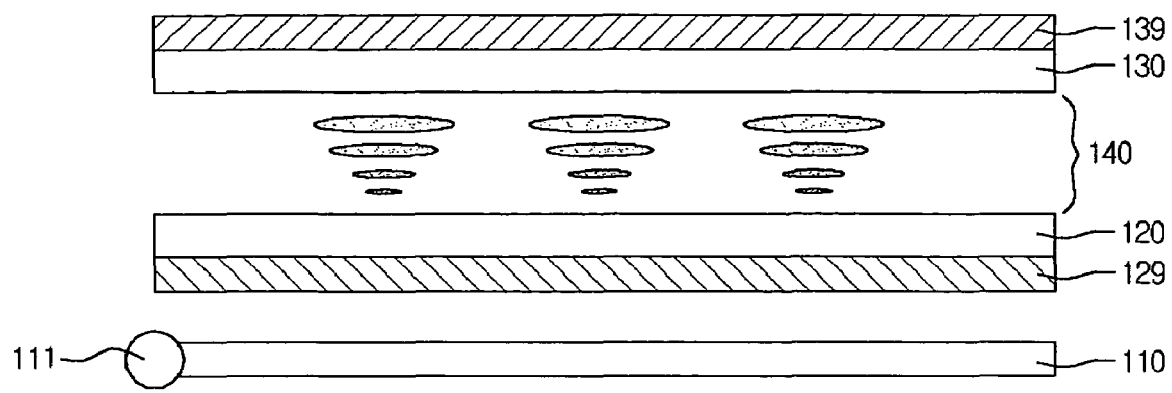
FIG. 1 illustrates a general LCD according to the related art.
Figure 2:
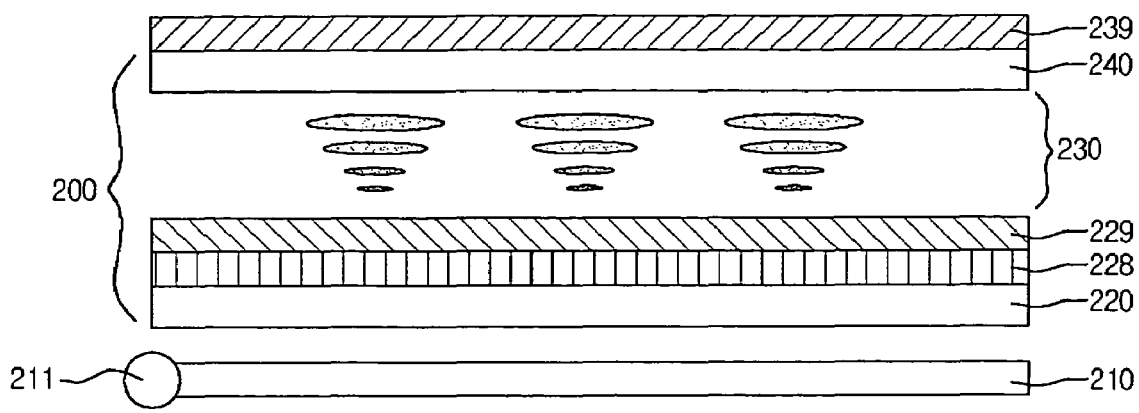
FIG. 2 illustrates an LCD according to an embodiment of the present invention.

FIG. 2 illustrates an LCD according to an embodiment of the present invention.

Referring to FIG. 2, the LCD according to an embodiment of the present invention includes a lower substrate 220, an upper substrate 240, a liquid crystal layer 230, a first polarization plate 229, a second polarization plate 239, and an optical efficiency enhancing film 228. The lower substrate 220 is provided with pixel regions defined by gate lines (not shown) and data lines (not shown) and TFTs (not shown) arranged in matrix configuration. The upper substrate 240 corresponds to the lower substrate 220 and is provided with a color filter layer (not shown) consisting of a plurality of color filter patterns to represent colors. The liquid crystal layer 230 is made by filling liquid crystal between the upper substrate 240 and lower substrate 220. The first polarization plate 229 is attached to a lower surface of the lower substrate 220, and passes and linearly polarizes natural light. The second polarization plate 239 is attached to an upper surface of the upper substrate 240 and has an optical transmission axis perpendicular to that of the first polarization plate 229. The optical efficiency enhancing film 228 is formed on the lower substrate 220 and has an optical transmission axis substantially identical to that of the first polarization plate 229.

The LCD may further include a backlight assembly 210 for supplying the light to the liquid crystal panel 200. The backlight assembly 210 is provided on the lower portion of the liquid crystal panel 200, which includes the lower substrate 220, the upper substrate 240 and the liquid crystal layer 230.

A phase difference film (not shown) may be further formed on at least one of outer surfaces of the lower and upper substrates 220 and 240. The phase difference film compensates for a viewing angle with taking the angle between viewing direction and the direction perpendicular to the plates into account, and enlarges the gray inversion-free region. In addition, the phase difference film enhances the contrast ratio in an inclined direction. The phase difference film may be made of a negative uniaxial film having a single optical axis or a negative biaxial film having two optical axes. The negative uniaxial film may be preferable from the viewpoint of optical viewing angle.

Light is projected from a light source 211 and applied to a light guide plate. Then, the backlight assembly 210 converts the incident linear light into uniform surface light and projects the surface light so that its traveling direction may be perpendicular to the liquid crystal panel.

The lower substrate 220 is provided with gate lines and data lines (not shown) formed on an inner surface of a transparent substrate on a side thereof in matrix configuration. The TFTs (not shown) are formed at crossings of the gate lines and the data lines and acts as switching devices. A pixel electrode connected to a drain electrode of the TFT is formed on a pixel region defined by the gate lines and the data lines.

The TFT formed on the lower substrate 220 may be an amorphous type TFT or a poly-silicon type TFT. The amorphous type TFT may be made of amorphous silicon containing hydrogen and has non-periodic lattice. The poly-silicon type TFT may be made of polycrystalline silicon according to the crystal condition of the semiconductor layer of an active layer.

A black matrix (BM), a color filter and a common electrode are formed on the inner surface of the transparent substrate of the upper substrate 230. The upper substrate 230 faces the lower substrate 220 having the pixel electrodes thereon.

If a voltage is supplied to one of the gate lines and one of the data lines are selected, the TFT supplied with the voltage is turned on and charge is stored on the pixel electrode connected to the drain electrode of the turned-on TFT. The alignment angles of the liquid crystal molecules are changed by the electric field generated between the pixel electrode and the common electrode.

Accordingly, the light is transmitted or blocked by controlling the electric field induced on liquid crystal molecules of dielectric anisotropy whereby images or pictures are displayed. The liquid crystal may be in TN mode, for example.

The first and second polarization plates 229 and 239 are disposed on the lower and upper substrates 220 and 240 respectively and they pass only the light oscillates in one direction. The first and second polarization plates 229 and 239 are formed having their optical transmission axes perpendicular to each other.

The optical efficiency enhancing film 228 may be coated between the liquid crystal layer 230 and the lower substrate 220 to be formed in "in-cell" configuration, or may be coated on the outer surface of the lower substrate 220 to be formed.

Figure 3:
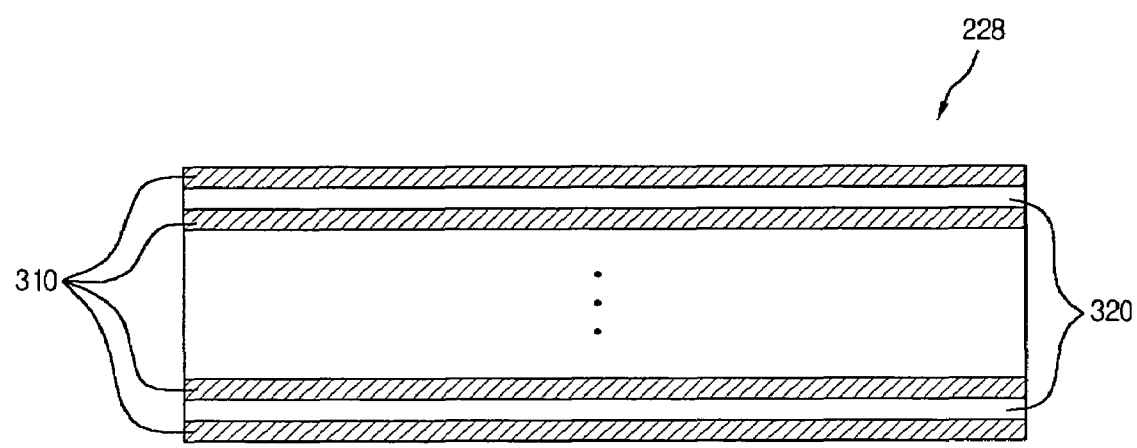
FIG. 3 illustrates an optical efficiency enhancing film provided in the LCD of FIG. 2.

FIG. 3 illustrates an optical efficiency enhancing film provided in the LCD of FIG. 2.

In FIG. 3, the optical efficiency enhancing film 228 includes uniaxial films 310 made of a refractive index anisotropic material, and isotropic films 320, wherein a plurality of uniaxial films 310 and a plurality of isotropic films 320 are successively and alternately laminated. The uniaxial film 310 may be an A-plate. The isotropic film 320 may be replaced with one selected from the group consisting of a C-plate of biaxial film and a negative C-plate aligned vertically.

The optical efficiency enhancing film 228 is made by aligning optical hardening liquid crystal polymer to have a uniform optical axis.

The optical efficiency enhancing film 228 acts as a polarizer. The liquid crystal is given a selective reflection property due to the laminated uniaxial films 310 and isotropic films 320 so that only the light of a specific wavelength among incident light is reflected according to a pitch. At this time, the polarization of the reflected light is determined according to the alignment of the liquid crystal molecules. For example, when the liquid crystal molecules have left-handed structure in which the alignment of the molecules is twisted counter-clockwise along a rotation axis, only left-circular polarized light is reflected.

Light transmission paths of the LCD employing the optical efficiency enhancing film 228 will be described.

Figure 4A:
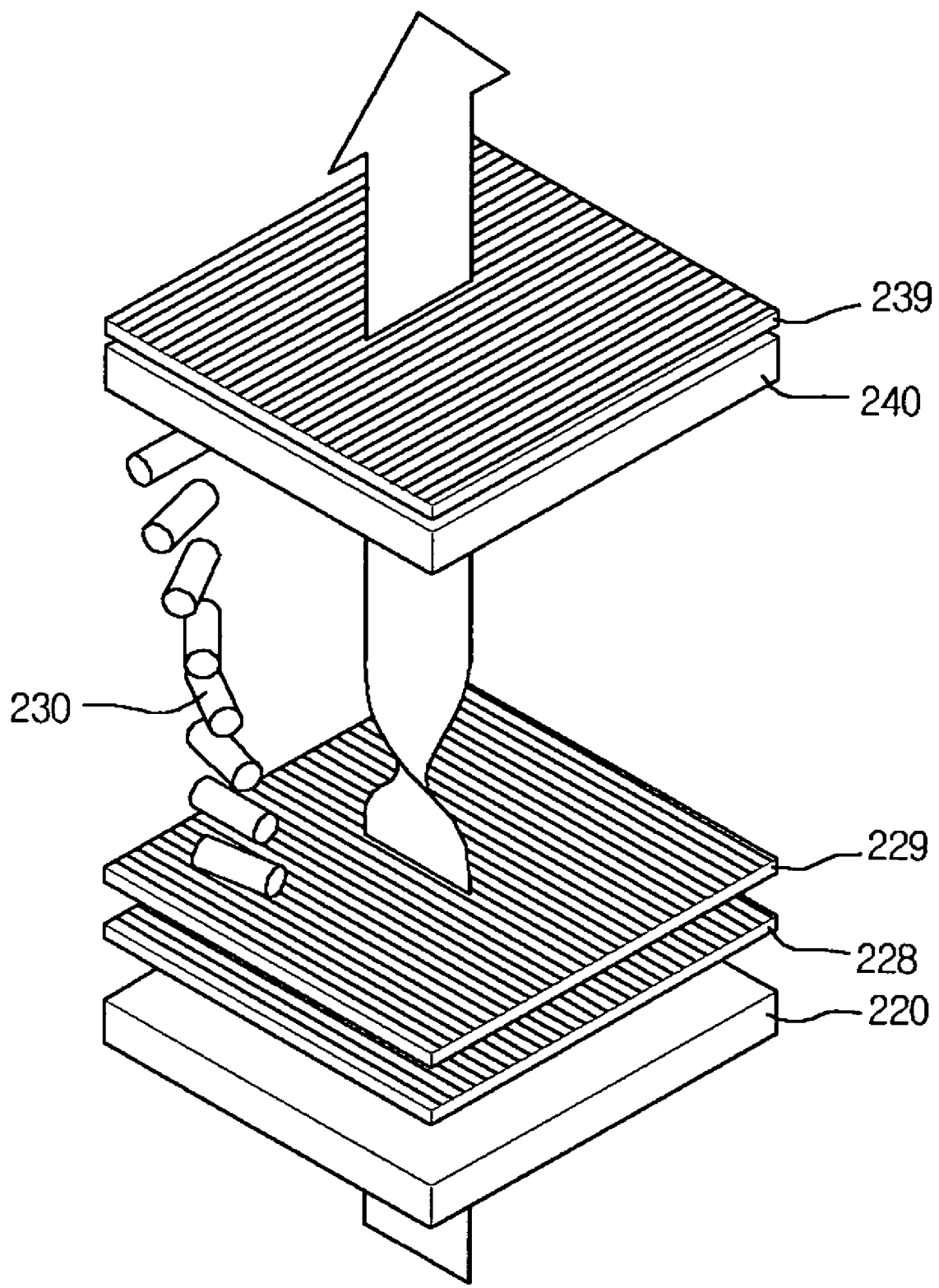
FIG. 4A illustrates a polarization path of light of the LCD of FIG. 2.

FIG. 4A illustrates a polarization path of light of the LCD of FIG. 2. In FIG. 4A, the LCD is not supplied with a voltage.

As illustrated in FIG. 4A, only a first linear polarized light (e.g. S wave) of incident light including natural light and ambient light is transmitted through the optical efficiency enhancing film 228.

Then, the non-polarized light of the first linear polarized light transmitted through the optical efficiency enhancing film 228 is transmitted through the first polarization plate 229 and polarized to be again converted into the first linear polarized light because the optical transmission axes of the optical efficiency enhancing film 228 and the first polarization plate 229 are substantially the same.

The first linear polarized light transmitted through the first polarization plate 229 is irradiated onto the liquid crystal layer 230. Since the liquid crystal layer 230 is not supplied with voltage, the light irradiated onto the liquid crystal layer 230 is converted to second linear polarized light (e.g. P wave), wherein the phase difference between the first and second linear polarized lights is substantially 90°.

Then, the second linear polarized light is transmitted through the upper substrate 240 and the second polarization plate 239. Thus, when no voltage is applied, the LCD transmits light, and is therefore considered "normally white" mode.

Figure 4B:
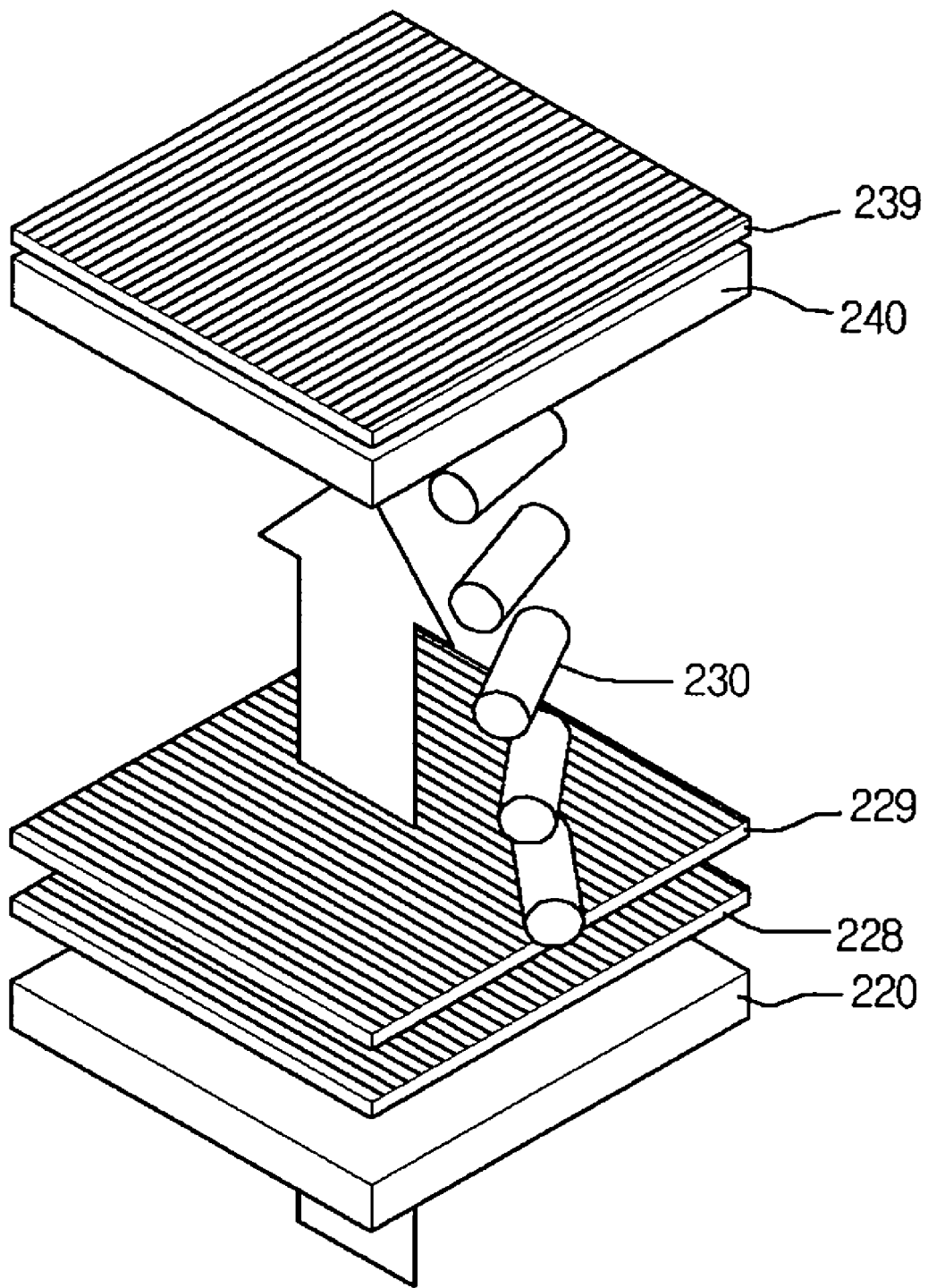
FIG. 4B illustrates another polarization path of light of the LCD of FIG. 2.

FIG. 4B illustrates another polarization path of light of the LCD of FIG. 2. In FIG. 4B, the LCD is supplied with a voltage.

As illustrated in FIG. 4B, when the LCD is supplied with the voltage, only a first linear polarized light (e.g. S wave) of incident light including natural light and ambient light is transmitted through the optical efficiency enhancing film 228.

Then, the non-polarized light of the first linear polarized light transmitted through the optical efficiency enhancing film 228 is transmitted through the first polarization plate 229 and polarized to be again converted into the first linear polarized light wherein the optical transmission axes of the optical efficiency enhancing film 228 and the first polarization plate 229 are substantially the same.

The first linear polarized light transmitted through the optical efficiency enhancing film 228 is irradiated onto the liquid crystal layer 230. Since the liquid crystal layer 230 is supplied with the voltage, the light irradiated onto the liquid crystal layer 230 is not converted and then is transmitted through the upper substrate 240. Then, the light transmitted through the upper substrate 240 is blocked by the second polarization plate 239 having optical transmission axis perpendicular to the first polarization plate 229.

Thus, according to the present invention, if the optical efficiency enhancing film 228 is made of anisotropic material and has an optical transmission axis identical to that of the first polarization plate 229, and if the optical efficiency enhancing film 228 is formed in the liquid crystal panel 200, then polarization of the non-polarized light generated by the lower substrate 220 may be enhanced to thereby improve the brightness of the LCD.

As one of skill in the art would appreciate, the present invention would also be applicable to a "normally black" LCD, which could be provided in the exemplary TN mode by making the polarization axes of the first and second polarization plates the same direction. The present invention would also be applicable to other modes of liquid crystal molecules, including Optically Compensated Birefringence (OCB) mode, Vertical Alignment (VA) mode, In Plane Switching (IPS) mode or Electrically Controlled Birefringence (ECB) mode.

In addition, according to the present invention, if the optical efficiency enhancing film 228 is made of anisotropic material, and if the optical efficiency enhancing film 228 is formed on lower substrate 220, then optical efficiency as well as polarization may be enhanced to thereby improve the brightness of the LCD.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical efficiency enhancing film for a liquid crystal display device, comprising:
    a plurality of uniaxial films made of a refractive index anisotropic material; and
    a plurality of intermediate films, wherein each intermediate film is a C-plate of biaxial film or a negative C-plate aligned vertically, and each of the uniaxial films and each of the intermediate films are alternatively laminated to contact each other,
    wherein each of the uniaxial films is an A-plate.

2. A liquid crystal display device, comprising:
    a lower substrate provided with pixel regions defined by gate lines and data lines, and thin film transistors arranged in matrix configuration;
    an upper substrate corresponding to the lower substrate and provided with a color filter layer consisting of a plurality of color filter patterns to represent colors;
    a liquid crystal layer interposed between the upper substrate and lower substrate;
    an optical efficiency enhancing film coated on an inner surface of the lower substrate, wherein optical efficiency enhancing film includes a plurality of uniaxial films made of a refractive index anisotropic material and a plurality of intermediate films, each intermediate film being a C-plate of biaxial film or a negative C-plate aligned vertically, and each of the uniaxial films and each of the intermediate films being alternatively laminated to contact each other;
    a first polarization plate disposed on the optical efficiency enhancing film;
    a second polarization plate disposed on the upper substrate and having an optical transmission axis perpendicular to that of the first polarization plate; and
    a backlight assembly disposed on outer surface of the lower substrate,
    wherein the optical efficiency enhancing film has an optical transmission axis substantially identical to the first polarization plate, and has an optical transmission axis perpendicular to the second polarization plate.

3. The liquid crystal display device according to claim 2, wherein the optical efficiency enhancing film has a property of a polarizer for converting natural light into linearly polarized light.

* * * * *